Nov. 15, 1932.  B. CLUSS  1,887,921
BEAN CUTTING DEVICE
Filed July 31, 1930
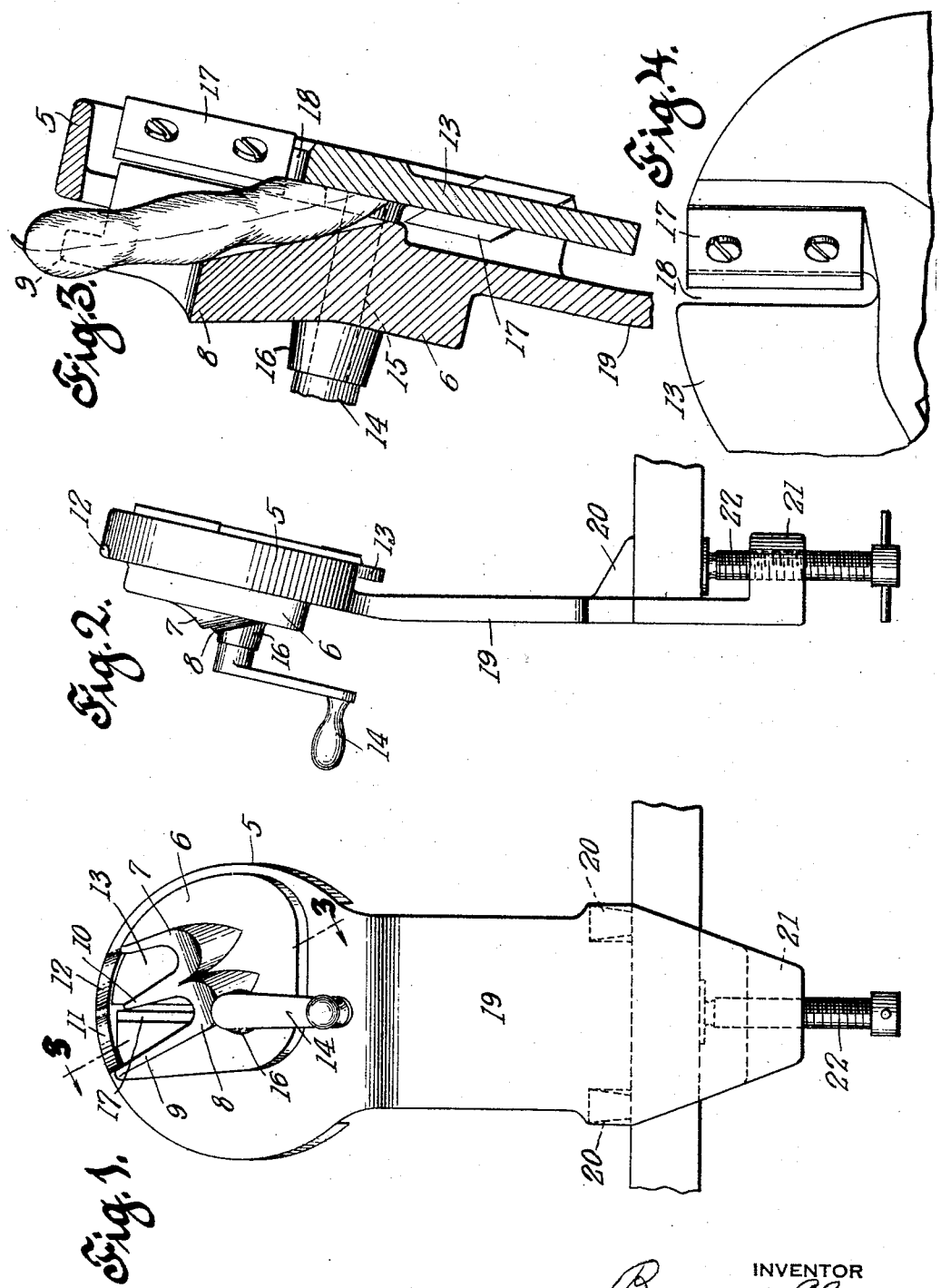
INVENTOR
Bernard Cluss
BY
Fred C. Fischer
ATTORNEY Patented Nov. 15, 1932

1,887,921

UNITED STATES PATENT OFFICE

BERNHARD CLUSS, OF NUTLEY, NEW JERSEY

BEAN CUTTING DEVICE

Application filed July 31, 1930. Serial No. 471,907.

This invention relates to a device for cutting string beans into transverse sections preparatory to cooking.

Heretofore, the cutting of string beans, due mainly to their peculiar shape, has been done by hand, and the process is tedious and laborious. Also, when cut by hand the sections are not uniform, and in many instances the beans are crushed.

It is an object of this invention to provide a device for cutting string beans into sections uniformly and without crushing.

A further object is the provision of a string bean cutting device which may be conveniently and easily manipulated, and which involves a few parts so that the cleaning thereof is simple.

These and other advantageous objects are attained by the novel construction, combination and arrangement of parts hereinafter described and shown in the accompanying drawing, constituting a material part of this disclosure and in which:

Figure 1 represents a front view of the device.

Figure 2 represents a side view of the device.

Figure 3 represents a sectional view taken on line 3—3 of Figure 1.

Figure 4 represents an enlarged plan view of a segment of a rotating cutter plate used in the device.

Referring to the drawing, the bean cutting device is shown to include an annular casing 5 having its front wall enlarged at 6, and provided with a pair of outwardly inclined grooves 7 and 8 having flanges 9, the grooves being immediately below slots and which are separated by a partition 10.

The slots open into a pair of inwardly inclined grooves being designed to receive a pair of string beans as shown in Figure 3. In order to facilitate positioning beans in the grooves, the upper edge of the casing is grooved at 11 and 12, see Figure 1.

Journalled in a boss 16 projecting from the enlargement 6 is a shaft 15, to which is attached a crank 14. Fixed to shaft 15 is a circular plate 13 having spaced inclined surfaces to which are attached cutting blades 17, the edges of which pass through slots 18 in the plate 13 and extend slightly beyond the opposite face thereof.

Integral with the casing 5 is a downwardly extending support 19 having projecting therefrom lugs 20 and 21, the lug 21 being in threaded engagement with a bolt 22 by means of which the device may be clamped to a table top.

In operation, string beans are fed in pairs through the slots above grooves 7 and 8 into the grooves on the inner face of the enlargement 6. As will be seen from Figure 3, the grooves are inclined towards the plate 13, and consequently, a portion of the beans will project into the space between the casing and plate 13.

When the plate 13 is rotated, the beans are cut in transverse angular slices. As each slice is cut, the blade 17 pulls the beans down with it to present another of the beans in position for the following blade 17. The cut portions of the beans fall through the casing 5, the lower edge of which is open, into a receptacle which may be placed on the table below.

As will be seen from Figure 3, the plate 13 forms a rear wall for the casing, and the blades 17 extend well into the casing so that there is little danger of injury to the operator. The device is simple and has few parts making it easy to assemble and to clean.

The device enables the rapid cutting of beans, and there is no crushing of the beans during the cutting as is the case when beans are cut by hand.

The foregoing disclosure is to be regarded as descriptive and illustrative only, and not as restrictive or limitative of the invention, of which obviously an embodiment may be constructed including many modifications without departing from the general scope herein indicated and denoted in the appended claim.

Having thus described my invention, what I claim as new and desire to secure by Letters Patent, is,

A device for cutting string beans, comprising a casing having a front wall, said front wall being enlarged, the enlarged portion being provided with inclined, spaced grooves, the upper edge of the casing being further provided with grooves spaced from and in alignment with the first-named grooves to facilitate positioning beans in said first named grooves, a boss on the enlarged front wall of the casing, a shaft journalled in said boss, a crank attached to said shaft, for actuating the same, a plate fixed to said shaft and forming the rear wall of the casing, said plate having spaced, inclined surfaces and slots adjacent thereto, cutting blades attached to the inclined surfaces, the edges of the blades extending through the slots, the lower edge of the casing being provided with an opening, whereby on rotation of said plate, said blades will be progressively brought into engagement with the beans positioned in the grooves in the front wall of the casing, and the cut portions of the beans will fall through the lower open edge of the casing.

This specification signed this 29th day of July, 1930.

BERNHARD CLUSS.